Dec. 23, 1941.  L. G. KURTZ ET AL  2,266,770
SELF-LOADING TRUCK
Filed July 31, 1937  12 Sheets-Sheet 1
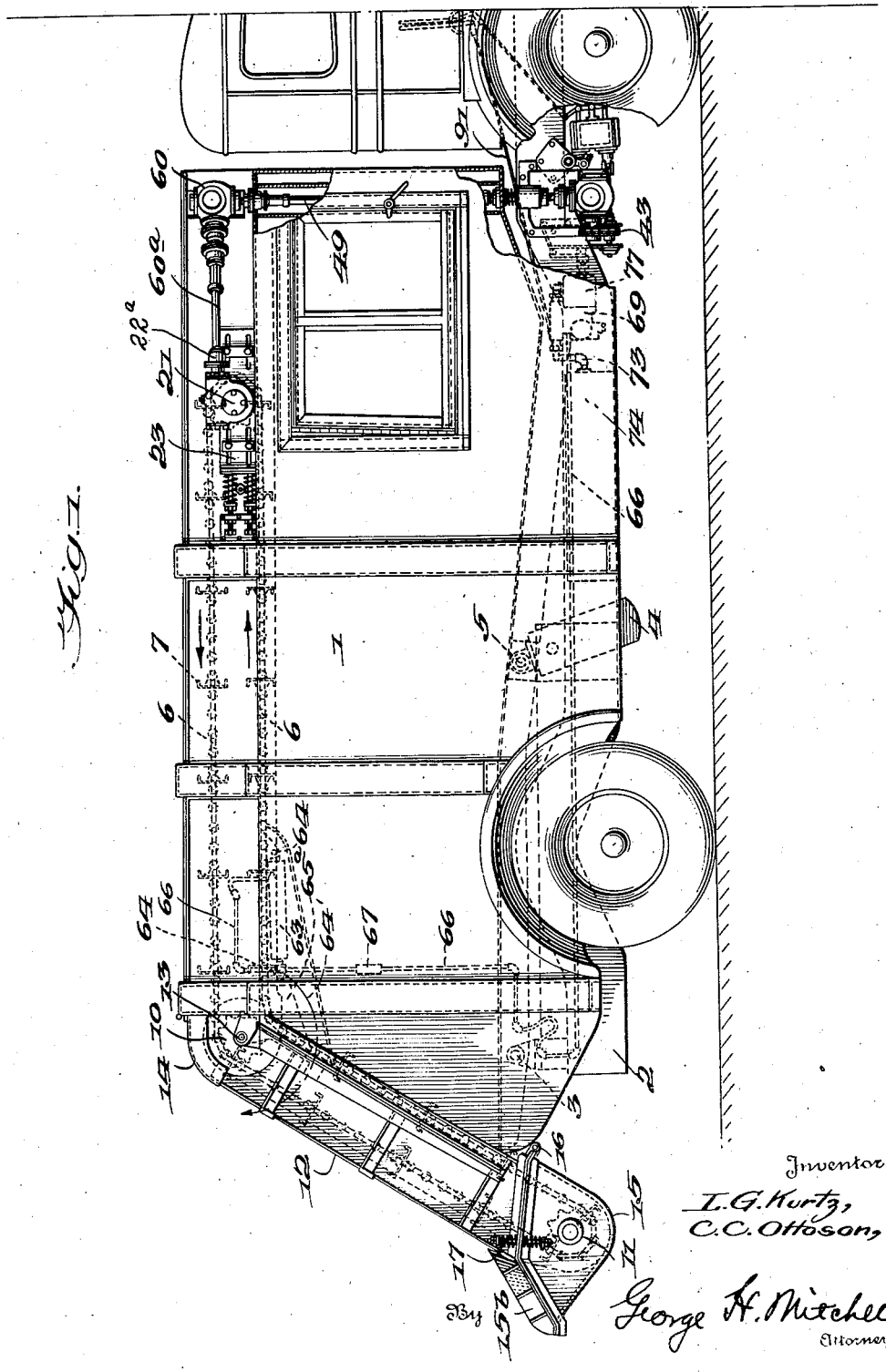

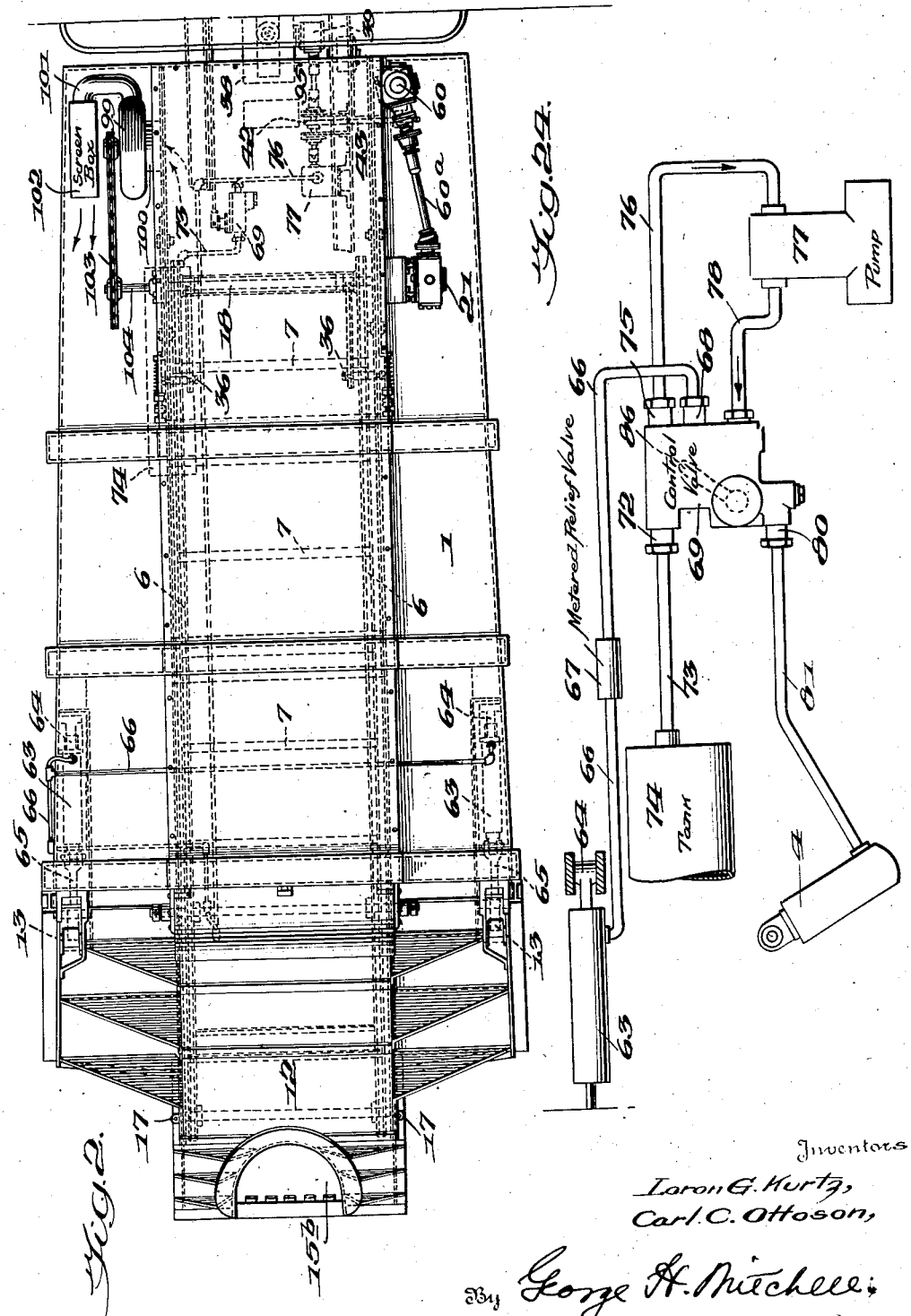

Dec. 23, 1941.   L. G. KURTZ ET AL   2,266,770
SELF-LOADING TRUCK
Filed July 31, 1937     12 Sheets-Sheet 3
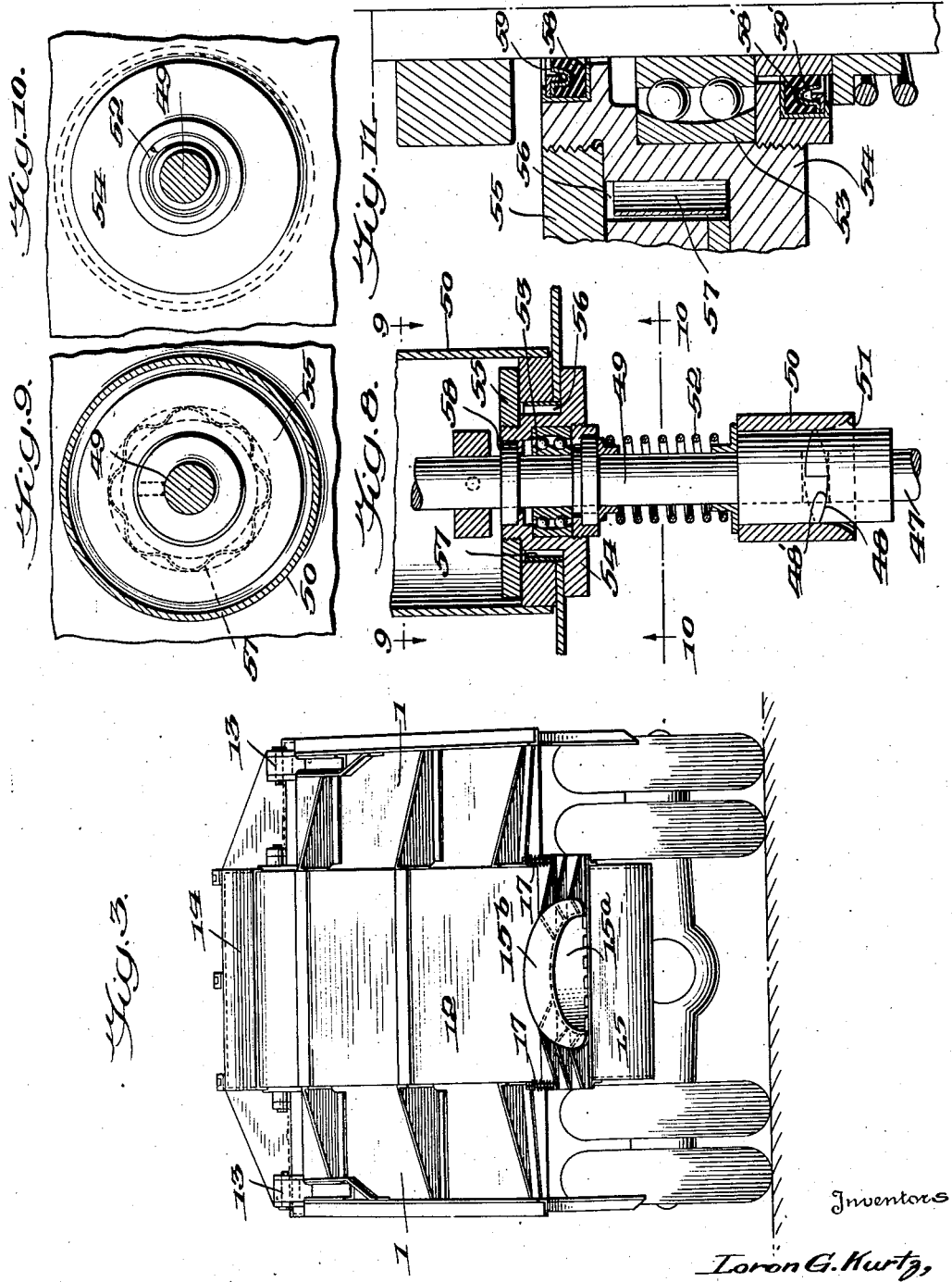
Inventors
Loron G. Kurtz,
Carl C. Ottoson,
By George N. Mitchell
Attorney.

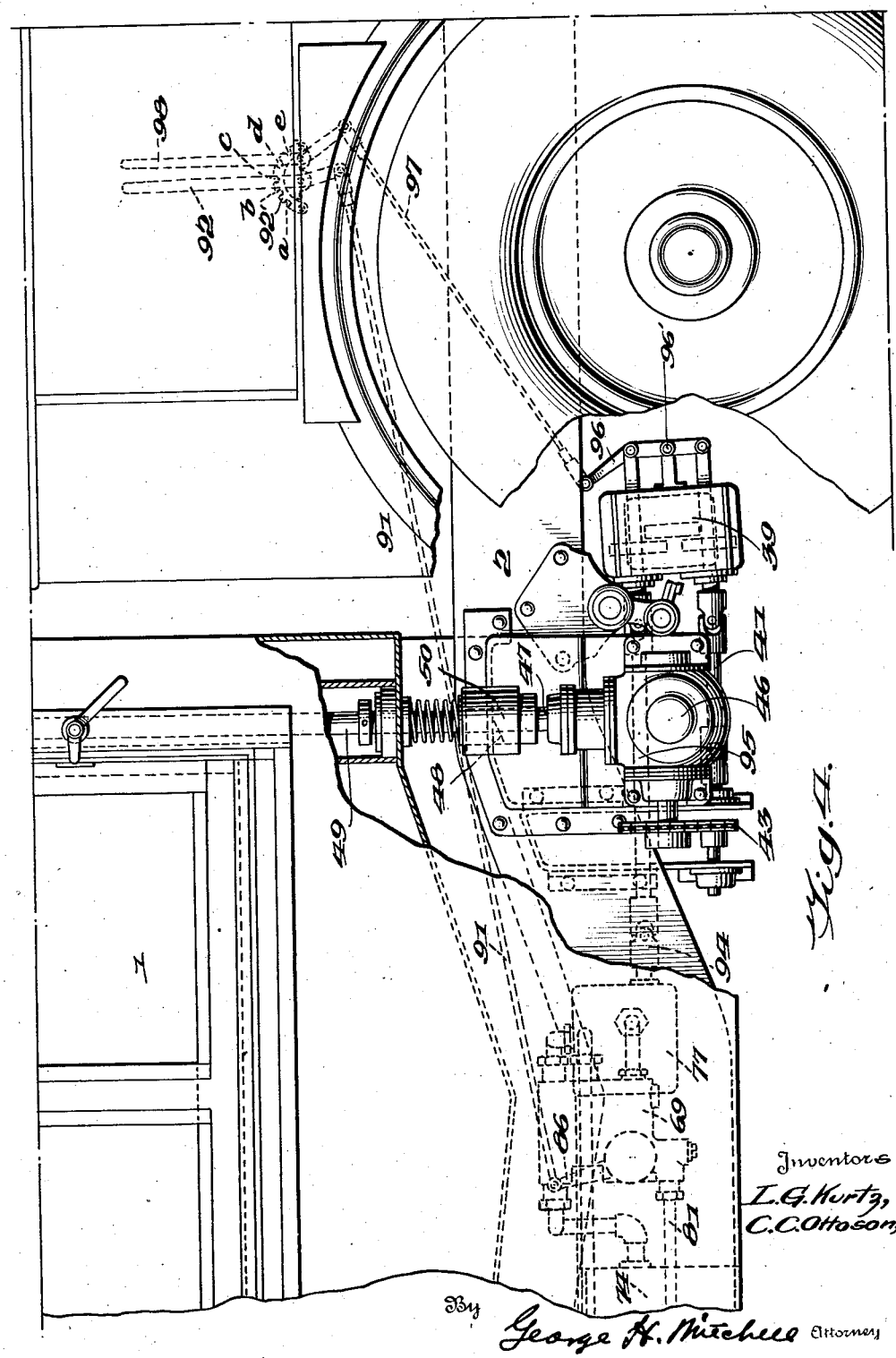

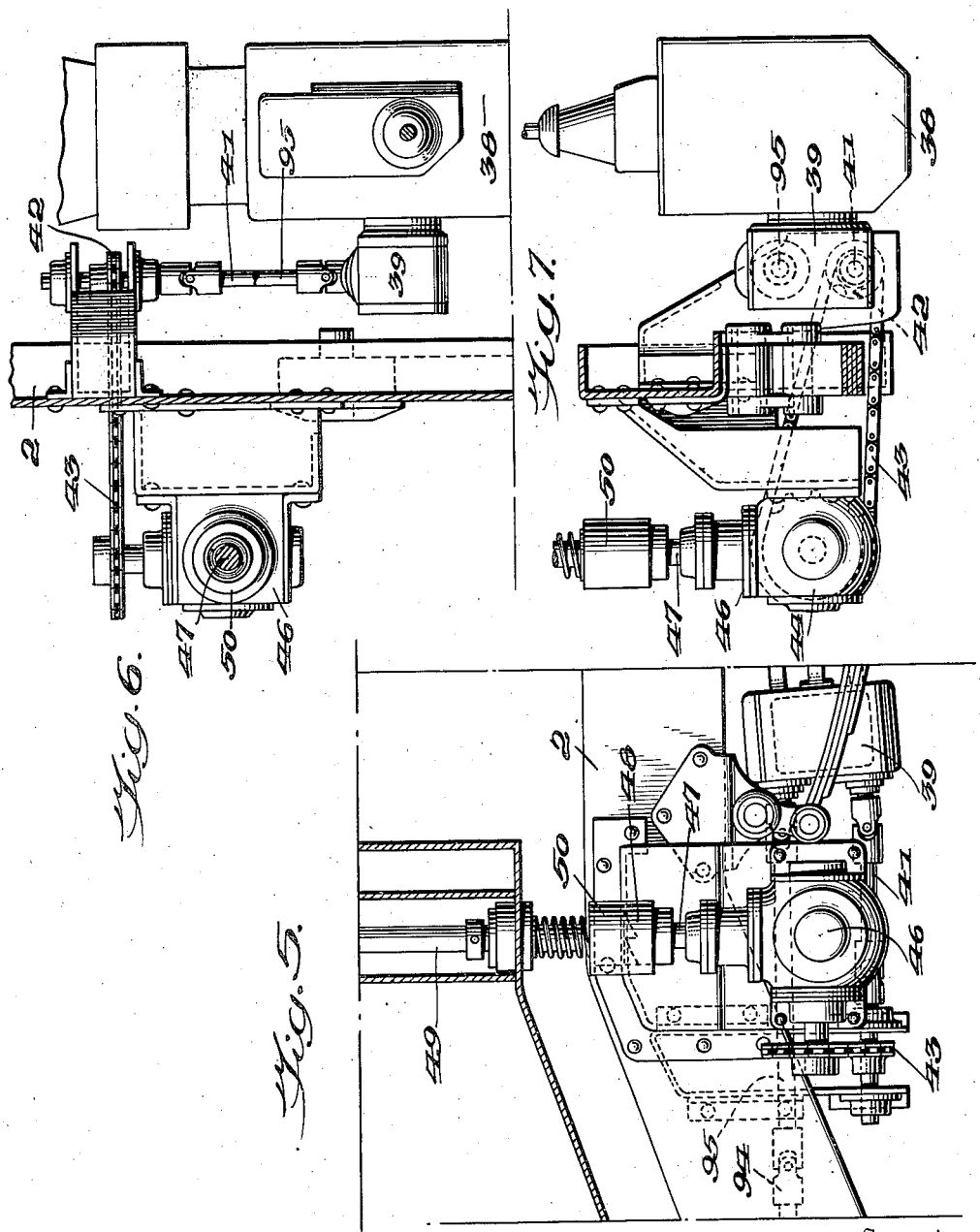

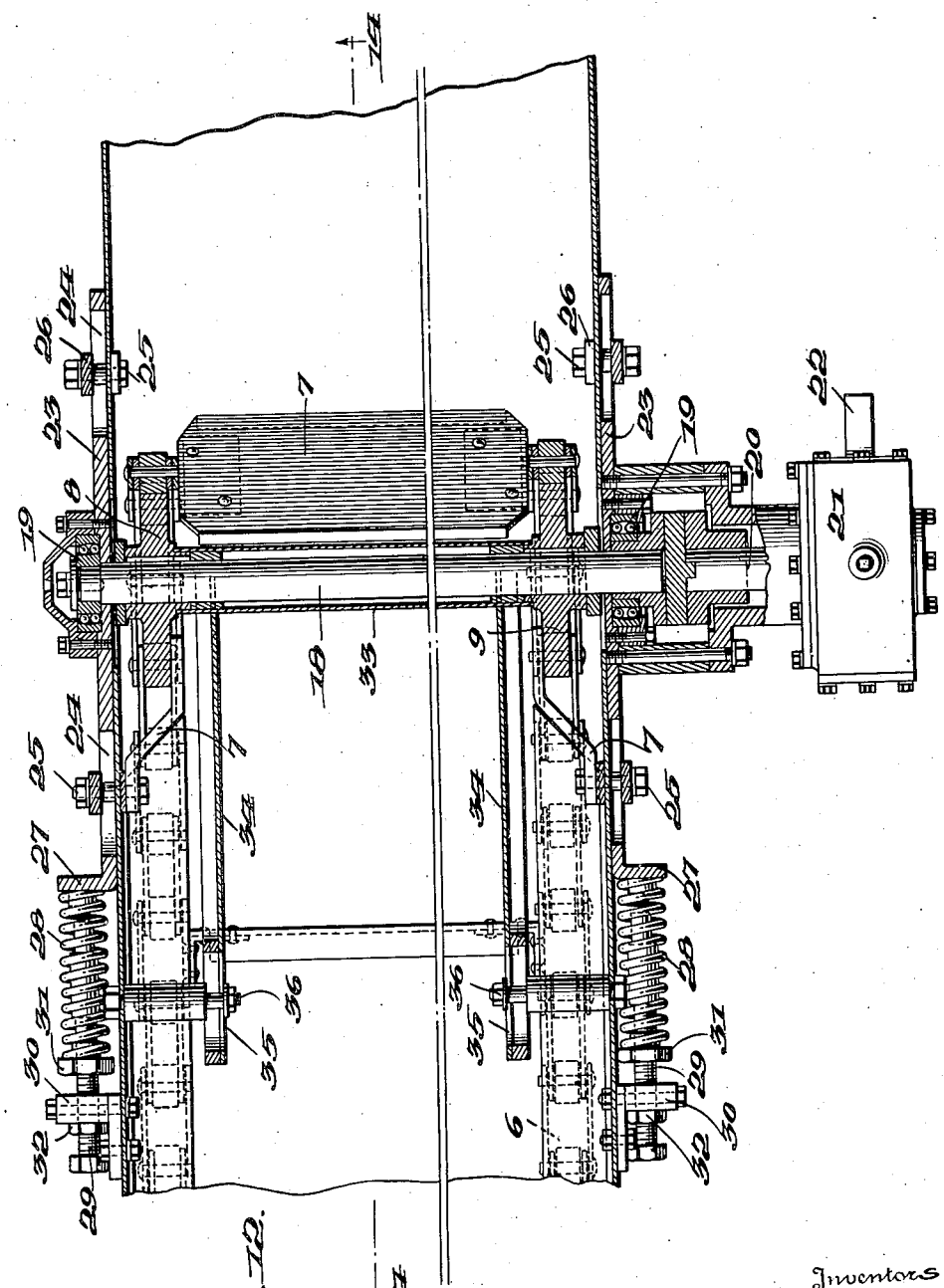

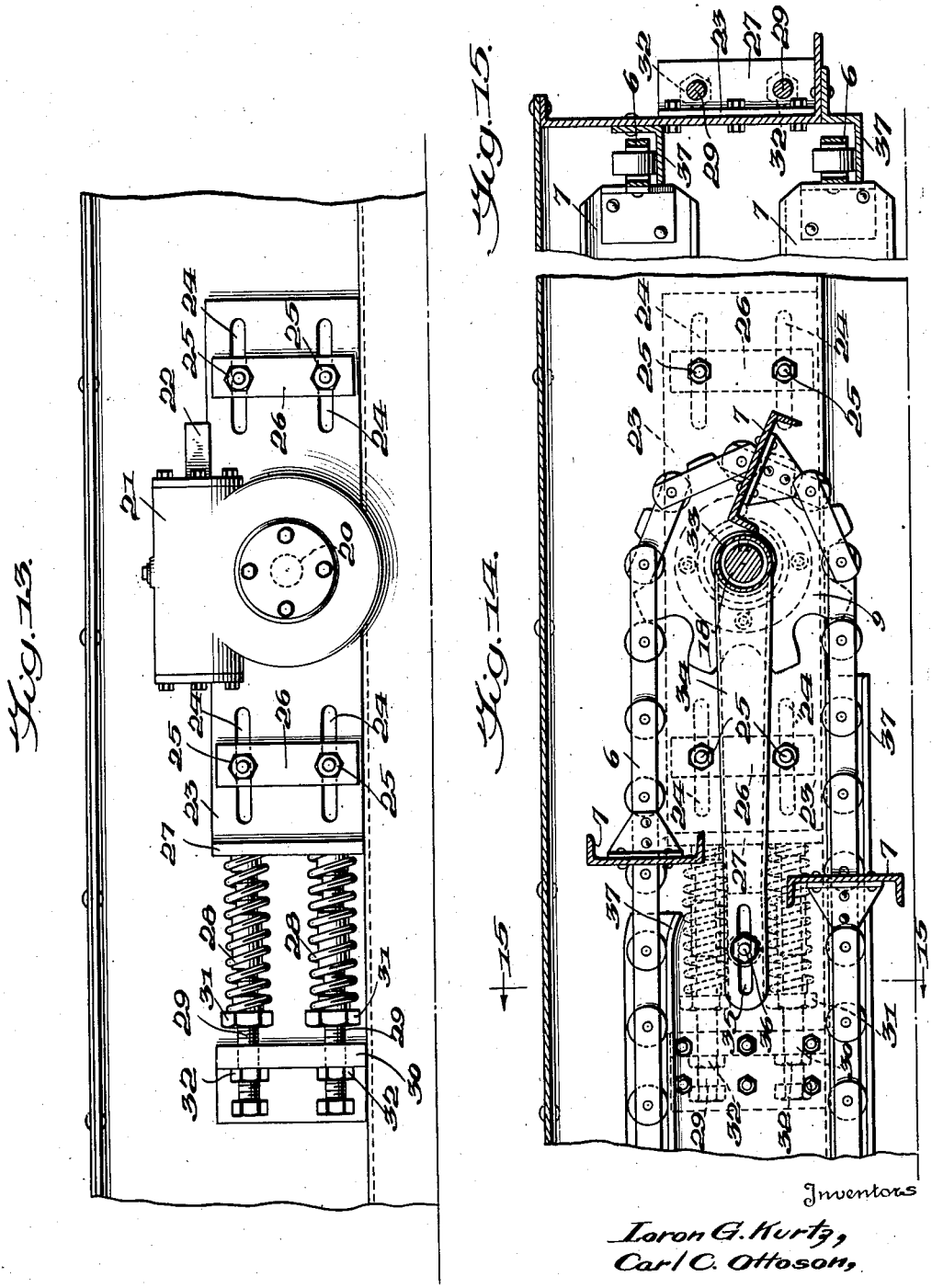

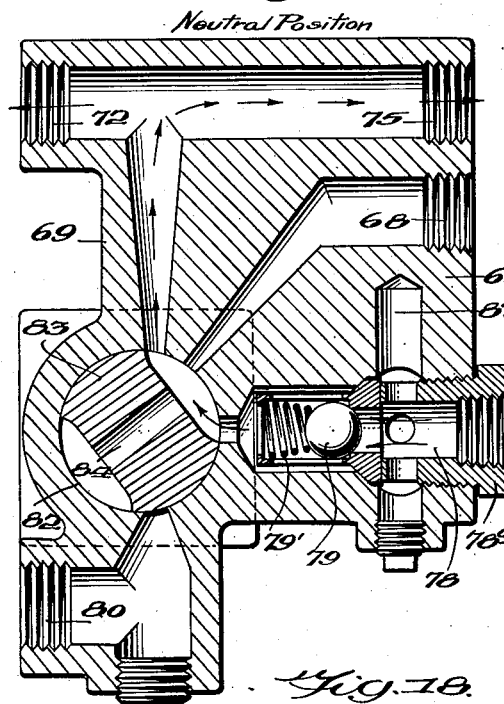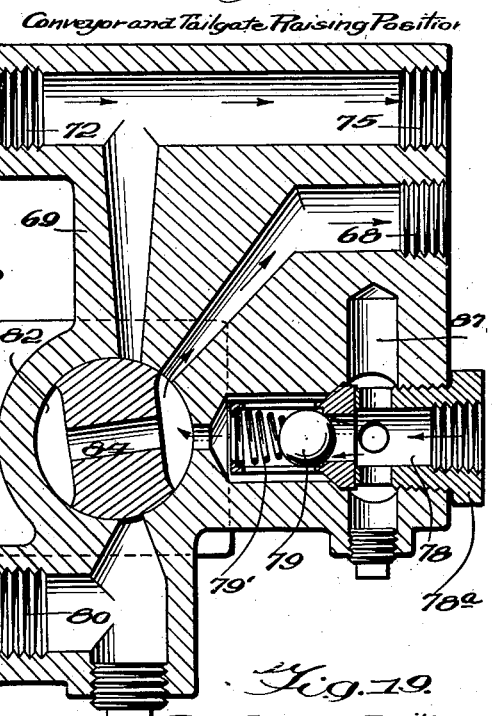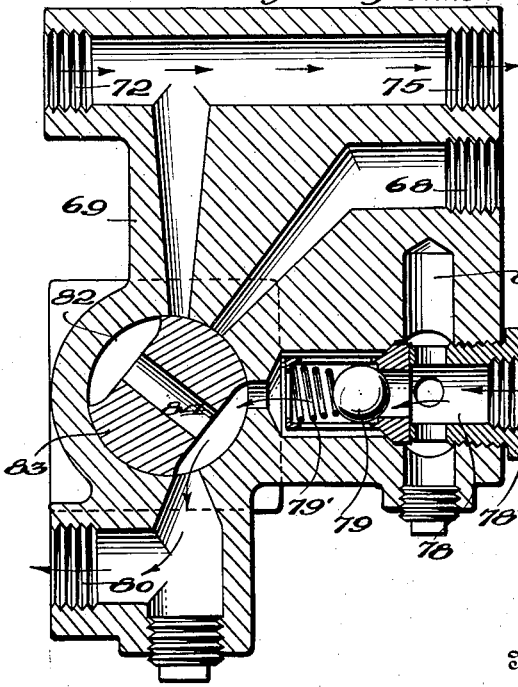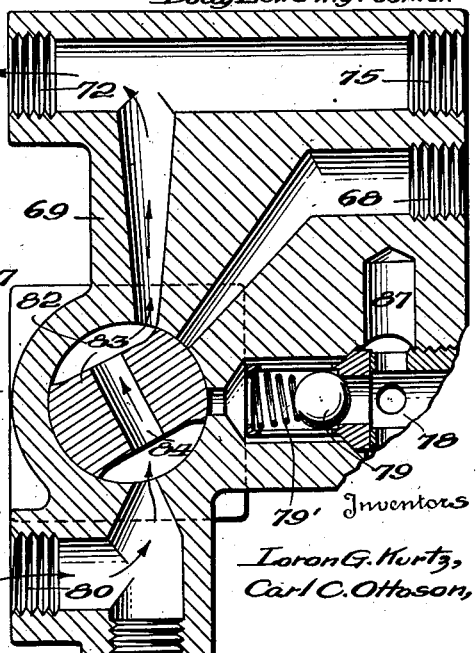

Dec. 23, 1941.   L. G. KURTZ ET AL   2,266,770
SELF-LOADING TRUCK
Filed July 31, 1937   12 Sheets-Sheet 9

Conveyor and Tailgate Lowering Position

Inventors
Loron G. Kurtz,
Carl C. Ottoson,
By George H. Mitchell
Attorney

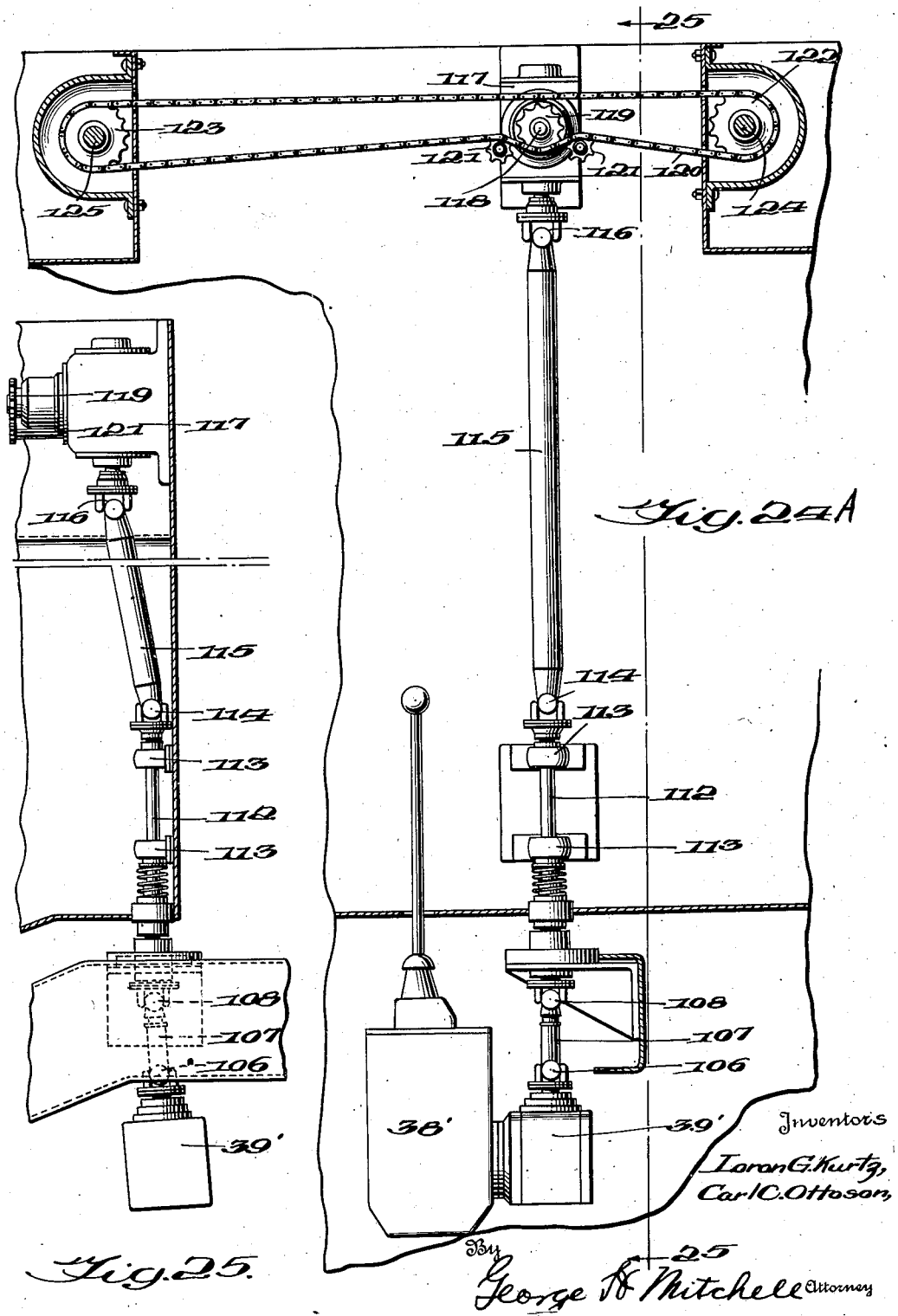

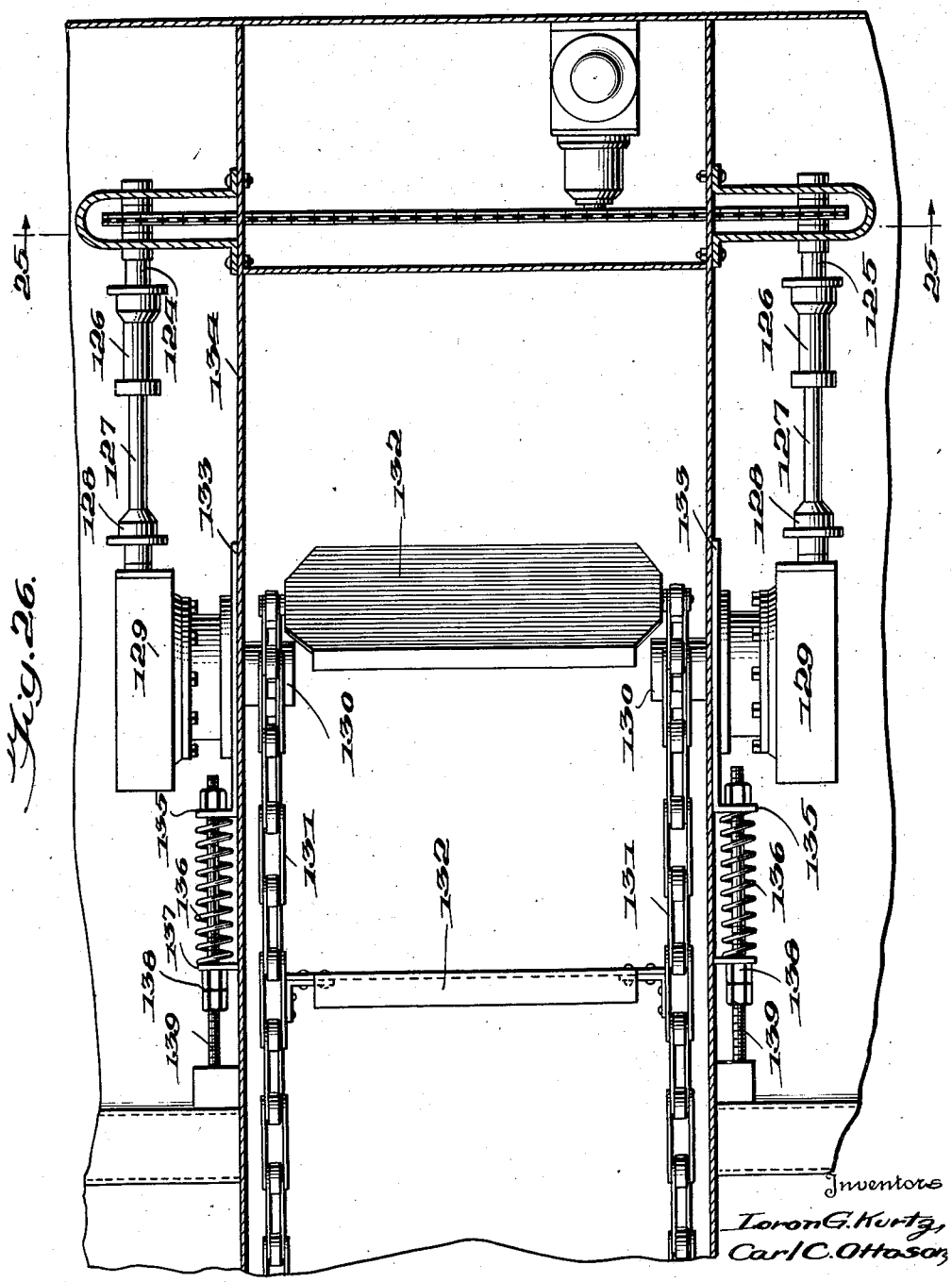

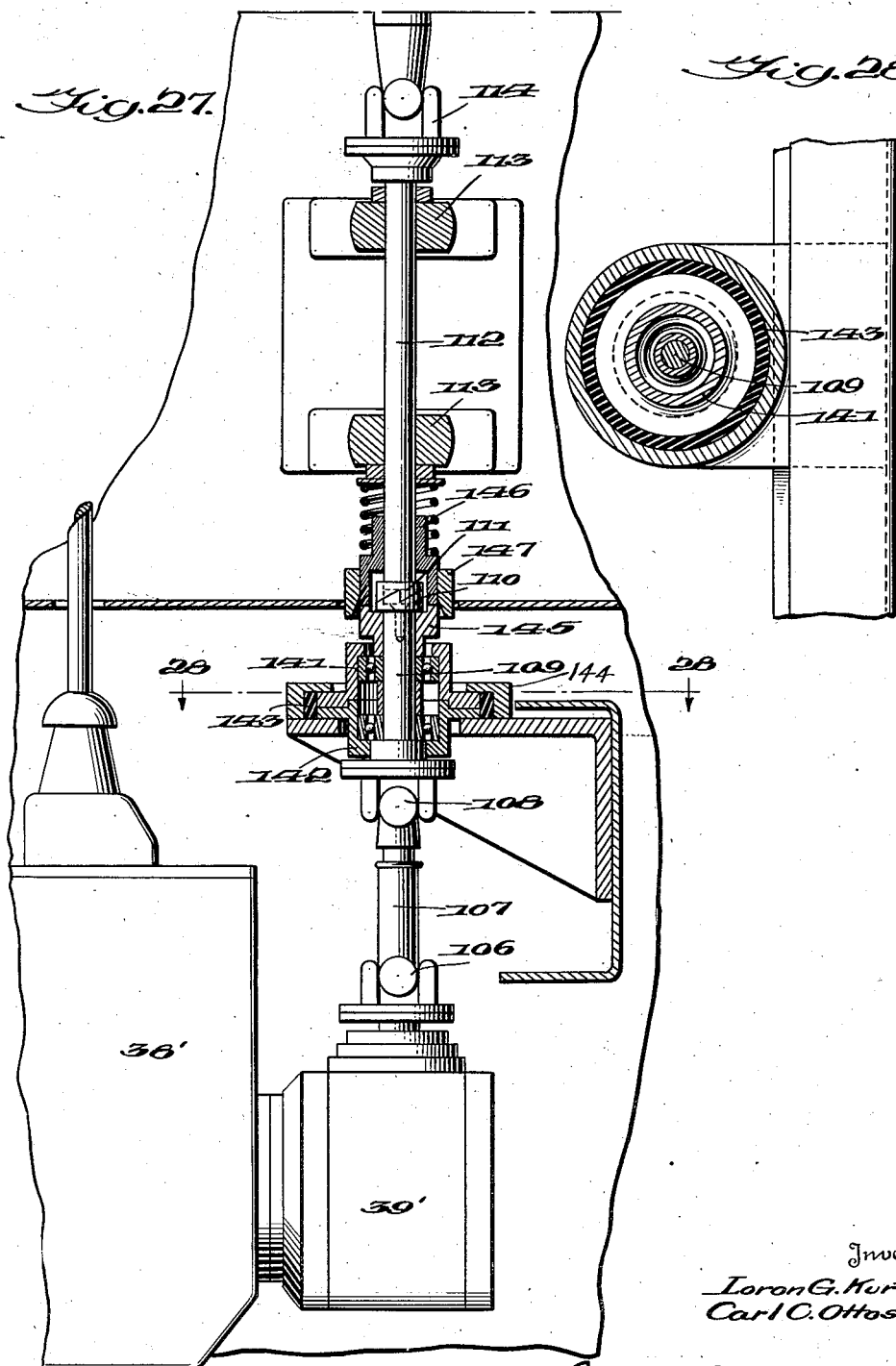

Patented Dec. 23, 1941

2,266,770

UNITED STATES PATENT OFFICE 2,266,770

SELF-LOADING TRUCK

Loron G. Kurtz, Brooklyn, and Carl C. Ottoson, Port Richmond, Staten Island, N. Y.

Application July 31, 1937, Serial No. 156,782

25 Claims. (Cl. 214—67)

This invention is an automotive dump truck, of the type having an endless conveyor for self loading. The endless conveyor is preferably mounted at the rear of the truck body, and has a downward extension extending toward the ground, to a point convenient for loading, and a horizontal extension extending into the upper, forward part of the truck body. A truck of this character is particularly adapted for handling refuse, ashes, garbage, sand, gravel, stone and analogous materials, which are fed to the lower, rear end of the conveyor and carried by it up and into the truck body.

The collection or dump body is preferably closed, for preventing the spread of dust and odors, thus providing a sanitary assembly. The horizontal portion of the conveyor extends into the upper part of the dump body and well toward the front thereof and serves to distribute the material evenly throughout the body and also to crush and compress the load into smaller volume.

The truck body is dumped by raising the front end thereof. Preferably, prior to dumping, the rear part of the conveyor is raised out of the way.

The principal objects of the invention are:

A. To provide, in a dump truck having a dump body and an endless conveyor having a downwardly extending portion at the rear, power operated means for raising and lowering the body for dumping and power operated means for raising and lowering the rear part of the conveyor, all in combination with control means which operates sequentially, whereby the rear part of the conveyor must be raised partially or completely before the body is raised for dumping.

B. To provide, in a dump truck having a dump body and an endless conveyor having a downwardly extending portion at the rear, power operated means for raising and lowering the body for dumping and power operated means for raising and lowering the rear part of the conveyor, all in combination with control means which operates sequentially, whereby, after the dumping has been completed, the body is lowered to substantially normal position before the rear part of the conveyor is lowered to the normal position. However, these lowering operations could take place simultaneously, rather than sequentially, if desired.

C. To provide, in a truck having an endless conveyor, improved mounting and driving means for the conveyor.

D. To provide, in a dump truck provided with an endless conveyor, improved resilient mounting means for the conveyor, for absorbing sudden shocks that might be impressed on the conveyor and for compensating for possible slight variations in length of the conveyor incident to the raising and lowering of the rear part thereof.

E. To provide, in a dump truck provided with power operated means for raising and lowering the body and for raising and lowering a part of the endless conveyor, improved power take-off and power transmission means, for transmitting power to the endless conveyor when it is in normal loading position, and for disconnecting this power transmission preparatory to dumping.

F. To provide, in a dump truck provided with an endless conveyor at the rear, power operated means under the control of the operator for raising and lowering that portion of the conveyor at the rear end of the truck.

G. To provide, in a dump truck provided with a conveyor having a downwardly extending portion at the rear, hydraulic means for raising and lowering this downwardly extending portion, including means, preferably a metered relief outlet valve, for cushioning and retarding the lowering of this portion of the conveyor, and tail gate, to normal position, without the usual jar.

H. To provide, in a dump truck of the character described, an exhaust fan for creating a slight inward air flow through any small openings, thereby preventing the escape of dust through such openings. The current of air from such fan would, of course, be screened or filtered.

The invention also comprises, in addition to the foregoing, further improved features of construction and operation, which will be described in connection with the accompanying drawings, illustrating in some detail the present preferred embodiment of the invention.

In the drawings:

Figure 1 is a side view, partly in section, of the improved refuse collecting truck forming the subject matter of this invention;

Figure 2 is a plan view of the same;

Figure 3 is an end view;

Figure 4 is a side view of a portion of the truck showing a portion of the power transmitting unit for transmitting power to the conveyor on the truck body;

Figure 5 is an enlarged side view of a power transmitting assembly for delivering power to the truck body for operating the conveyor;

Figure 6 is a plan view of the same;

Figure 7 is an end view of Figure 6;

Figure 8 is a vertical sectional view of the power transmission clutch;

Figure 9 is a section on the line 9—9 of Fig. 8, looking in the direction of the arrows;

Figure 10 is a sectional view on the line 10—10 of Fig. 8, looking in the direction of the arrows;

Figure 11 is an enlarged detail view of a portion of Fig. 8;

Figure 12 is an enlarged plan view, partly in section, of the forward end of the conveyor;

Figure 13 is a side view of the same;

Figure 14 is a section on the line 14—14 of Fig. 12;

Figure 15 is a fragmentary section on the line 15—15 of Fig. 14;

Fig. 16 is an enlarged sectional view of the control valve and associated parts for controlling the operation of raising and lowering the conveyor and tail gate, and the body, the valve being in neutral position;

Figure 17 shows the control valve in the position for raising the conveyor and tail gate;

Figure 18 shows the control valve in position for raising the body;

Figure 19 shows the control valve in position for lowering the body;

Figure 24 is a diagrammatic view of the control valve and its connections to the parts controlled thereby.

Figure 24A is a vertical sectional view of a modified form of drive for the conveyor;

Figure 25 is a section on the line 25—25 of Fig. 24A;

Figure 26 is a plan view of the modified conveyor drive of Fig. 24A;

Figure 27 is an enlarged view, partly in vertical section, of details of the modified conveyor drive of Fig. 24A; and Figure 28 is a section on the line 28—28 of Fig. 27.

Figure 20:
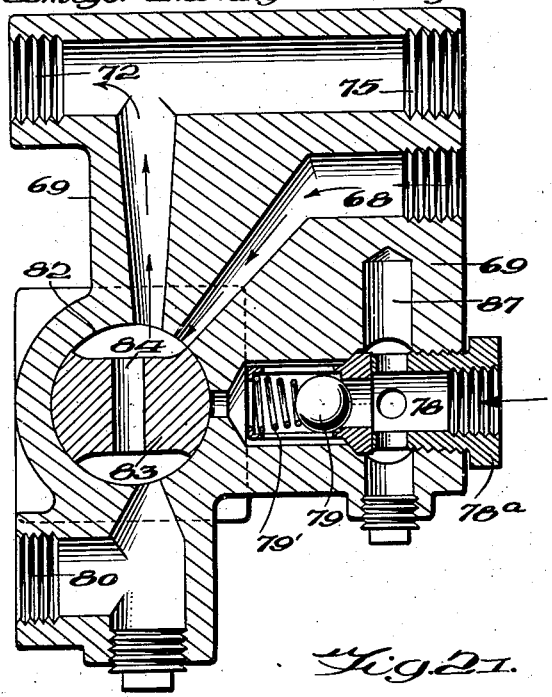
Figure 20 shows the control valve in position for lowering the conveyor and tail gate.

Referring now to these drawings, in which similar reference characters indicate similar parts, the dump body indicated generally at 1 is mounted on the automotive chassis 2, being pivoted thereto on the pivot 3, for rearward dumping, the raising of the body for dumping being preferably accomplished by a known type of hydraulic jack 4 carried by the chassis and connected to the body 1 at 5. Any other suitable type of body raising and lowering device could be used.

The body 1 is substantially completely enclosed for preventing the escape of dust and odors. An endless conveyor indicated generally at 6 and provided with blades or flights 7 engages with and is driven by power driven sprockets 8 and 9, Fig. 12, located at the forward end of the conveyor, this forward end, as indicated in Figure 1, being inside the upper part of, and well toward the front of the body 1. The lower stretch of the conveyor moves to the right, as shown by the arrows in Fig. 1. The conveyor passes around sprockets 10 carried at the upper rear part of the body 1 and then downwardly and rearwardly to and around the sprockets 11, sprockets 11 being in the lower end of a pivoted conveyor housing 12. The sprockets 10 could be omitted and guide rails used instead. This conveyor housing 12, the back or right-hand portion of which forms or carries the tail gate for closing the body 1, is pivoted at its upper portion to the upper rear end of the truck body on the axis 13, a sliding, substantially dust-proof hood, with which the upper end of the housing 12 telescopes, being shown at 14.

The lower end of the housing 12 is provided with a boot 15, pivoted to swing up and down on the pivot 16, springs 17, engaging respectively with the housing and with the boot, being provided as an aid in opening and closing the boot. The upper part of the boot is open, as at 15a, to feed material to the conveyor, the opening being bordered by a funnel flange 15b.

To describe further the mounting for the forward end of the conveyor, the sprockets 8 and 9 are carried by a drive shaft 18 mounted in suitable bearings 19. Shaft 18 is coupled to shaft 20, which is preferably the axle of a conventional worm gear mounted in gear casing 21, the worm of which is driven by a shaft 22, having a squared end, to which is attached a universal joint 22a, which is coupled to drive shaft 60a.

The resilient mounting for the forward end of the conveyor will now be described. The bearings for the drive shaft 18 are mounted in suitable housings on movable side plates 23. The plates 23 are provided with guide slots 24 through which pass retaining bolts or guides 25, held in place by plates 26, the bolts having shoulders thereon on which the plates 26 rest, to provide a clearance so that the plates may slide back and forth in a horizontal direction. The described gear box 21 and associated parts are carried by and also move back and forth with the plates 23. The plates 23 are provided, at their inner ends, with flanges 27 against which bear strong compression springs 28 coiled around a threaded shaft 29 which passes through a stud member 30, suitable nuts 31 and 32 being provided for controlling the positioning of the shaft 29 and the degree of compression on the springs, as will be readily understood, for controlling the force exerted by the springs on the plates 23. From the described construction it will be evident that the forward end of the conveyor can move longitudinally in the slots 24 against the tension of the springs 28, thereby cushioning the conveyor against sudden shocks and compensating for any slight variations in length of the conveyor as it is raised and lowered.

The drive shaft 18 is provided with a guard 33 supported on rearwardly extending arms 34, provided with slots 35 engaging over the fixed studs 36, the arms 34 being thereby enabled to slide back and forth with the sprockets and drive shaft. This guard and arms are for preventing pieces of rags, rope, etc., from wrapping around the rotating drive shaft 18.

The conveyor 6 is provided wherever necessary with supporting guideways 37.

The power take-off for taking power from the engine of the vehicle and transmitting it to the drive shaft 18 of the conveyor will now be described, reference being made particularly to Figures 4, 5, 6, 7 and 8. The housing 38 contains gears, shafts, etc., driven from the engine of the vehicle. Power from the housing 38 is carried into a gear shift housing 39 and delivered to a lower drive shaft 41, which in turn drives a sprocket 42 that drives the chain 43, which in turn drives the sprocket 44, and this sprocket, through suitable gears in the housing 46, drives the vertical shaft 47. The upper end of shaft 47 is provided with a clutch face 48. The parts thus far described are carried by the chassis. The parts now to be described are carried by the truck body and are raised and lowered with it. The truck body is provided with a shaft 49, the lower end of which is provided with a clutch face 48' for cooperative engagement with the clutch face 48. In order to facilitate this engagement, and keeping in mind that the shaft 49 is raised and lowered with the body of the truck, the lower part of shaft 49 is provided with a slidable guide collar 50, chamfered at 51, for guiding the clutch faces into engagement, collar 50 being resiliently mounted by means of the spring 52.

As the shaft 49 is raised and lowered with the truck body, its movement is slightly arcuate and to allow for this arcuate movement there is provided a self-aligning bearing 53, which bearing is mounted in a collar 54 supported by a complemental collar 55, these collars having a slight lateral movement, the clearance for which is shown at 56, see Fig. 8. Mounted within the clearance 56 is a sinuous spring 57 which allows the collars 54 and 55 to move laterally, but tends to bring them back to the central position. In order to prevent grit, etc., from the truck body from reaching the bearings, upper and lower washers 58 and 58' of rubber or the like, may be provided, held in place by retaining elements 59. From the described construction it will be seen that as the truck body is raised, the clutch faces 48 and 48' automatically disconnect themselves and as the truck body is lowered, the collar 50 takes over the clutch face 48, being guided to position by the collar 50, the self-aligning bearing 53 and its mounting allowing the shaft 49 to move slightly from the vertical to compensate for the slight arcuate movement of shaft 49.

The shaft 49, as shown more particularly in Fig. 1, passes into a gear box 60 and through suitable gears drives the shaft 60a, which is coupled, slidably, with the drive 22, Fig. 13, of the worm gear in casing 21, which worm gear, as has been described, drives the drive shaft 18 for the conveyor. The ratio of the sprockets, worm and other gears used should be arranged to give the conveyor a speed of about 60 feet a minute, with an engine speed of 450 R. P. M.

In practice, it is desirable to first raise the tail gate, and then to raise the body. However, these operations may be reversed, if desired, and provided the tail gate has sufficient clearance to clear the ground even if the body is raised first.

For this purpose, of raising the tail gate, hydraulic jacks 63 are provided, these jacks being pivotally secured, at their right-hand ends, to pivots 64, the piston or power members of the jacks being connected to power arms 65, which in turn are connected at their outer ends to brackets 65a, rigid with the housing frame 12, so that upon operation of the jacks, the housing 12 will be raised out of the way.

Brackets 65a extend below and well to the right of the pivot axis 13 of the housing 12, whereby pivot 64 describes an arcuate path 64' as the housing 12 is raised and lowered.

Fluid under pressure is delivered to the jacks 63 through pipe 66, in which is a metered relief valve 67. The pipe 66 is connected with a control valve housing, to be described later. Evidently, as pressure is applied to the pipe 66, the jacks 63 will be operated to raise the conveyor housing 12 and the tail gate carried thereby, and as the pressure is relieved, through the metered relief valve 67, these parts will be lowered gradually.

Figure 22:
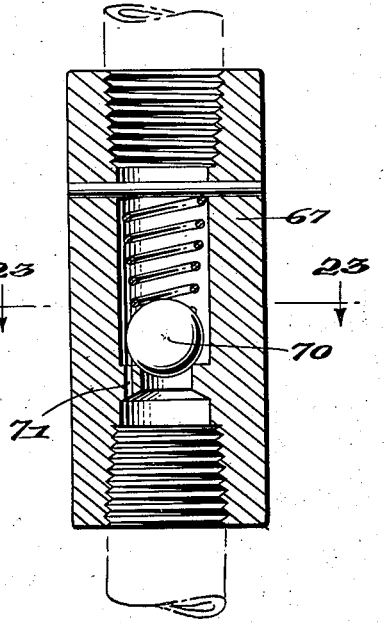
Figure 22 is an enlarged sectional view of the metered relief outlet valve for retarding the lowering of the tail gate.

The metered relief valve 67, shown in Fig. 22, is provided with a spring-pressed ball 70, which allows free flow of oil to the jacks 63 for raising them. The reverse flow of oil, however, is much slower, taking place only through the small metered by-pass 71, whereby the oil pressure is relieved only gradually, resulting in a gradual lowering of the housing 12 and the tail gate.

The control valve housing, see Figs. 16-21, and Fig. 24, indicated generally at 69, has an outlet 68 connected to pipe 66 for the jacks 63. The valve housing also has an outlet 72 connected by a pipe 73 to an oil tank 74. The valve housing is also provided with an outlet 75 connected by a pipe 76 to the suction side of the pump 77. The valve housing is connected to the pressure side of the pump by a pipe 78, threaded into the nipple 78a, this nipple being provided with a one-way valve formed by the ball 79 and spring 79'.

The control valve housing 69 is also provided with an outlet 80, which is connected by a pipe 81 to the jacks 4 for raising and lowering the body. The several described inlets and outlets all communicate with the circular, cylindrical valve chamber 82, in which is rotatably mounted the valve body 83, of the shape shown, the valve body being provided with a central passageway 84. The valve body 83 is secured to an operating shaft 85, which is controlled by an operating arm 86.

Figure 21:
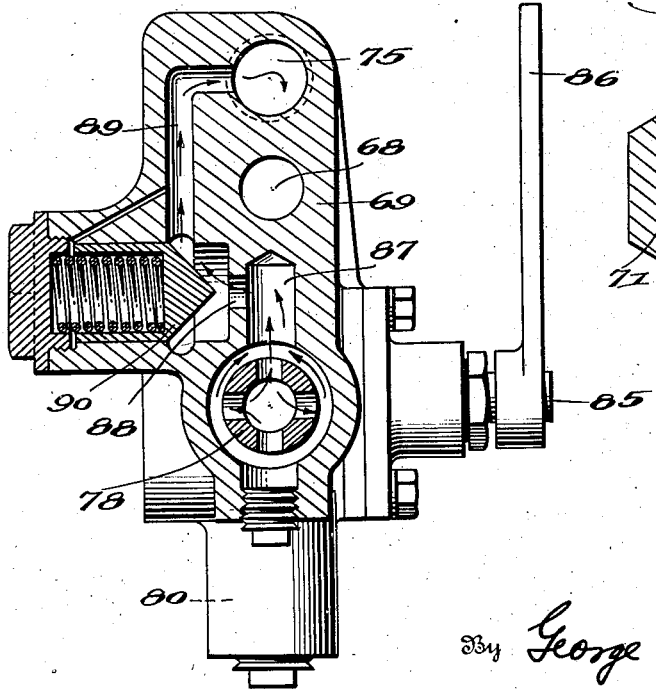
Figure 21 is a sectional view through the control valve taken at right angles to the views just described.
Figure 23:
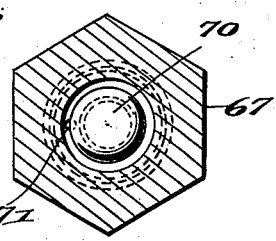
Figure 23 is a section on the line 23—23 of Fig. 22.

In order to relieve excess pressure, at the end of the upstroke a by-pass, comprising passages 87, 88 and 89, see Fig. 21, is provided, controlled by a spring-pressed, relief valve 90, which relieves excess pressure of oil and by-passes it back to the pump. This is to relieve pressure when the tail gate and truck body reach their up position, thus avoiding over loading the hydraulic pumps and the pressure lines.

The valve 83 is controlled by an operating rod 91, connected to the operating arm 86, the operating rod 91 being controlled by a control handle 92, which is advanced step by step on the rack 92', so as to assume the following sequential positions:

1. First or neutral position, shown in Fig. 16. In this position, oil is simply circulating from the pump to the valve and back to the pump. The handle 92 is now in the first notch a of the rack 92'.

2. Second or conveyor and tail gate raising position, shown in Fig. 17, in which oil under pressure passes into passage 68 and pipe 66, to the jacks 63 for raising the conveyor and tail gate. The handle 92 is placed in the second notch b of the rack for this operation.

3. Third or body-raising position, shown in Fig. 18, in which the oil under pressure is held in the tail gate raising jacks 63 and oil under pressure is applied to the jacks 4 through pipe 81 for raising the body. The handle 92 is placed in the third notch c of the rack for this operation. When these two operations have been completed, the tail gate and conveyor are raised and the body has been raised and dumped.

4. Fourth position, shown in Fig. 19, where pressure is being relieved from the body raising jacks 4 and passed back through the passage 84 in the valve and outlet 72 to the tank, thereby causing the body to be lowered. The handle 92 is placed in the fourth notch d of the rack for this operation.

5. The final or tail gate lowering position, shown in Fig. 20, where the oil pressure is being relieved from the jacks 63 for lowering the tail gate. As has been described, this oil must pass through the metered relief valve 87, whereby the lowering of the tail gate is gradual. The handle 92 is placed in the fifth notch 3 of the rack for this operation.

The foregoing operations are sequential. After the sequence of operations has been completed, the control handle 92 is returned to its original position, which restores the valve to the position shown in Fig. 16.

If it is desired to lower the body and the tail gate simultaneously, the operator will move the manual control lever from the notch c on the rack to notch e, skipping notch d, thus moving the control valve from the position shown in Fig. 18 directly to the position shown in Fig. 20. By so doing, it is evident that the oil pressure would be relieved simultaneously from the body raising jacks and from the tail gate jacks, with the result that both the body and the tail gate would be lowered simultaneously. However, due to the presence of the metered relief valve in the oil line from the tail gate jacks, it is evident that the tail gate would be lowered more slowly than the body.

The pump 77 for supplying oil under pressure is driven by a shaft 94, the shaft 94 in turn driven by a shaft 95, shaft 95 being connected to the upper part of the gear shift 39. The gear shift 39, as will be apparent from Fig. 4, is arranged to drive either the lower shaft 41, which drives the conveyor, or, in the alternative, for driving the upper shaft 95 for driving the oil pump. Inasmuch as when the conveyor is being operated there is no need for oil pressure for operating the lifting jacks and, conversely, when the lifting jacks are being operated, the conveyor is not in operation, the gears in the gear shift 39 are arranged to drive either the lower shaft 41 or the upper shaft 95, but not to drive them both at the same time. The gear shift may, of course, also assume a neutral or inoperative position. A control lever 96 pivoted on the axis 96' for shifting the gears is provided, this lever being connected by a rod 97 to the manual control handle 98, which may be provided with the usual rack for holding it in any given set position.

The exhaust fan for creating a slight suction within the body 1 for causing inward flow of air through crevices for preventing the escape of dust will now be described. Such an exhaust fan could be placed in various positions. One possible arrangement is shown in Fig. 2, where the exhaust fan 99 has its inlet 100 in communication with the interior of the body 1, the exhaust 101 of the fan delivering to a screen or outlet box 102 which would filter out dust before allowing the air to escape. The fan 99 may conveniently be driven by a chain 103 which, in turn, is driven by a sprocket carried on an extension 104 of the shaft 18. The chain 103 would be sufficiently slack to allow for back and forth movements of the shaft 18, which slack would be taken up by an idler. Or, an elastic belt could be used in place of the chain 103.

A modified drive for the endless conveyor will now be described. In the conveyor drive shown in Fig. 12, the two drive sprockets are on a common drive shaft. In the modified drive about to be described, the common drive shaft is eliminated, and the two sprockets driven separately. The elimination of the transversely extending drive shaft presents the advantage of giving greater clearance space at the discharge end of the conveyor, which facilitates the unloading thereof. Furthermore, any tendency for strings, ropes, rags, etc., to wrap around the drive shaft is eliminated by omitting the drive shaft.

Referring now to Figures 24 to 28, showing this modified drive, power from the gear housing 38', corresponding to housing 38, is transmitted by suitable shafts and gears to the gear shift housing 39', corresponding to the gear shift housing 39, arranged to drive alternately the hoist oil pump or the conveyor, as has been described. Power from the gear shift housing 39 for driving the conveyor is transmitted to the universal joint 106, shaft 107, universal joint 108, and to shaft 109, the upper end of which is provided with a clutch element 110. The clutch 110 engages with clutch 111 carried by the lower end of the shaft 112, which is rotatably mounted in suitable pillow blocks 113.

It will be understood that the shaft 109 and associated parts are carried by the chassis, and that the shaft 112 and associated parts are carried by the truck body as it is lifted for dumping, the break between the two shafts occurring at the clutch faces 110, 111.

The upper end of drive shaft 112 drives the universal joint 114 which is connected to a main drive shaft 115, which extends upwardly, usually at a slight inclination, to the universal joint 116, connected with the angle gear box casing 117, and drives shaft 118 on which is drive sprocket 119, which drives chain 120. Suitable idler sprockets 121 cooperate with the drive chain, and the chain drives sprockets 122 and 123 mounted respectively on forwardly extending shafts 124 and 125. These shafts 124 and 125 drive sleeves 126, Fig. 26, which telescopically engage with shafts 127, the engagement being such that sleeves 126 drive shafts 127, as by making the telescopically engaged parts angular in cross section. Shafts 127, through suitable connections 128, are operatively connected with the gear boxes 129 for worm gears, as by engagement with 22, Fig. 12, the worms of these gears (not shown) driving the usual worm wheel, each of the worm wheels driving shafts 130 which are provided with drive sprockets for driving the conveyor chains 131, the conveyor chains having the usual flights 132.

The modified drive is also provided with a resilient mounting, for the same general purpose as the resilient mountings shown in Figures 12, 13 and 14. To this end the gear casings 129, shafts 130 and associated parts are mounted on slidable plates 133, these plates being slidable on and engageable with the fixed, vertically disposed frame members 134. The mounting between the slidable plates 133 and the fixed plates 134 is of the bolt and slot type as shown in connection with the mounting of the slidable plates 23 in Figure 12 and such illustration is not repeated here. The slidable plates 133 are provided with upturned flanges 135 against which bear strong compression springs 136, the other end of the springs bearing against plates 137 held in place adjustably by the nuts 138 on a threaded shaft 139, around which the spring 136 is coiled. This resilient mounting achieves the same general effect as that achieved by the mountings shown in Figures 12, 13 and 14, the springs keeping the conveyor chains taut at all times and taking up any sudden shocks that may be impressed on the chains, as by the handling of very heavy material, such as paving blocks and the like. The slidable connection between the drive members 126 and 127 permits the fore and aft sliding movement of the sliding plates 133.

Also, with this modification, an exhaust fan of the type shown at 99, Figure 2, may be used, power for the fan being tapped off at any convenient point, as by taking it off the right-hand end of either of shafts 124 or 125, Figure 26.

To describe further details of the mounting for the shafts 109 and 112 and referring particularly to Figure 27, shaft 109 is mounted in a floating bearing comprising upper and lower collars 141 and 142, these collars being resiliently held at their outer edges by a resilient packing 143 kept in place by a retainer flange 144. The resilient packing 143 allows the bearing and the shaft to shift laterally for accurate coupling engagement of the clutch 110 and 111. The upper part of shaft 109, just below the clutch 110, is provided with a centering collar 145.

The upper shaft 112 is provided at its lower end with a spring mounted centering collar 146, which is provided with a centering ring 147, internally chamfered, for taking over the collar 145 for guiding the two clutch faces into engagement. It will be understood that the shaft 109 and its bearing and the lower collar 145 are carried by the chassis, while the upper shaft 112, collars 146 and 147 are carried by the truck body as it is raised, the break occurring at the clutch and between the two collars 145 and 146.

While the present preferred embodiment of the invention has been described in considerable detail, it should be understood that the invention is not to be limited to the precise details described and shown, but it may be carried out in other ways.

We claim as our invention:

1. In an automotive truck of the character described, in combination, a truck body, an endless conveyor mounted in the upper part of the truck body and having a pivotally mounted downward extension, means for raising the downward extension, means for raising the truck body, and unitary control means for causing the downward extension to be first raised and then held stationary as the truck body is raised for dumping.

2. In an automotive truck of the character described, in combination, a truck body, an endless conveyor mounted in the upper part of the truck body and having a pivotally mounted downward extension, means for resiliently mounting the conveyor, hydraulic means for raising said downward extension, and hydraulic means for raising the truck body, and means for driving the conveyor and for operating both said hydraulic means by power derived from the motor of the truck.

3. In an automotive truck of the character described, in combination, a truck body, an endless conveyor mounted in the upper part of the truck body and having a pivotally mounted downward extension, resilient means cooperating with the conveyor, for keeping it taut and for enabling it to absorb shocks, hydraulic means for raising the downward extension, hydraulic means for raising the truck body, and a common manual control for both said hydraulic means.

4. In an automotive truck of the character described, in combination, a truck body, an endless conveyor resiliently mounted at its forward end mounted in the upper part of the truck body and having a pivotally mounted downward extension, hydraulic means for raising said downward extension, hydraulic means for raising the truck body and a common manually operated control valve for consecutively operating both said hydraulic means, to effect consecutive operation of the raising of the downward and rearward extension and the raising of the truck body in the operation of raising the truck body for dumping.

5. In an automotive truck of the character described, in combination, a truck body, an endless conveyor mounted in the upper part of the truck body and having a pivotally mounted downward extension, hydraulic means for raising said downward extension, hydraulic means for raising the truck body and a common manually operated control means for both said hydraulic means for starting the raising of the downward extension before starting the raising of the body, to effect consecutive operation of the raising of the downward and rearward extension and the raising of the truck body in the operation of raising the truck body for dumping.

6. In an automotive truck of the character described, in combination, a truck body, an endless conveyor mounted in the upper part of the truck body and having a pivotally mounted downward extension, hydraulic means for raising said downward extension, hydraulic means for raising the truck body and a common manually operated control means for both said hydraulic means for lowering the downward extension and the body simultaneously or consecutively.

7. In an automotive truck of the character described, in combination, a truck body, an endless conveyor mounted in the upper part of the truck body and having a pivotally mounted downward extension, hydraulic means for raising said downward extension including as a part thereof means for retarding and cushioning the lowering of said downward extension to its original position, hydraulic means for raising the truck body, and a common control for both said hydraulic means.

8. In an automotive truck of the character described, in combination, a truck body, an endless conveyor mounted in the upper part of the truck body and having a pivotally mounted downward extension, means for raising and lowering said extension, means for raising and lowering said body, and means for resiliently mounting one end of the conveyor comprising a transversely extending drive shaft for the conveyor, bearings therefor, slidable plates for supporting said bearings, and resilient mounting means for said slidable plates.

9. In an automotive truck of the character described, in combination, a truck body, an endless conveyor mounted in the upper part of the truck body and having a pivotally mounted downward extension, means for raising and lowering said extension, means for raising and lowering said body and means for resiliently mounting one end of the conveyor comprising a transversely extending drive shaft for the conveyor, a guard around said shaft, bearings for said shaft, slidable plates for supporting said guard and said bearings, and resilient mounting means for said slidable plates.

10. In an automotive truck of the character described, in combination, a truck body, an endless conveyor mounted in the upper part of the truck body and having a pivotally mounted downward extension, means for raising and lowering said extension, means for raising and lowering said body, means for resiliently mounting one end of the conveyor comprising a transversely extending drive shaft for the conveyor, bearings therefor, slidable plates for supporting said bearings, resilient mounting means for said slidable plates and driving means for said drive shaft, mounted on and movable with one of said side plates.

11. In an automotive truck of the character described, in combination, a truck body, an endless conveyor mounted in the upper part of the truck body and having a pivotally mounted downward extension, means for raising and lowering said extension, means for raising and lowering said body, and means for resiliently mounting one end of the conveyor comprising a transversely extending drive shaft for the conveyor, a worm gear for driving said drive shaft, bearings for said drive shaft, slidable plates for supporting said worm gear and said bearings, and means for resiliently mounting said slidable plates.

12. In an automotive truck of the character described, in combination, a truck body, means for raising and lowering said body, an endless conveyor mounted in the upper part of the truck body and having a pivotally mounted downward extension, means for driving the conveyor at its forward end, means for transmitting power to said driving means, comprising a laterally extending shaft and a cooperating, downwardly extending shaft carried by the truck body, power supplying means on the chassis of the truck, and clutch coupling means, carried respectively by the lower end of said downwarlly extending shaft and by said power supplying means, for supplying power to said shaft, said clutch coupling means automatically disengaging and engaging, respectively, as the truck body is raised and lowered.

13. In an automotive truck of the character described, in combination, a truck body pivoted for dumping, a power driven endless conveyor mounted in the upper, rear part of the body and having a pivotally mounted downward extension, hydraulic means for raising and lowering the body, hydraulic means for raising and lowering the downward extension, means, driven by power derived from the motor of the truck, for supplying fluid under pressure for both said hydraulic means and unitary control means for said two hydraulic means for operating said two hydraulic means consecutively.

14. In an automotive truck of the character described, in combination, a truck body pivoted for dumping, a power driven endless conveyor mounted in the upper part of said body and having a pivotally mounted downward extension, hydraulic means for raising and lowering said downward extension, hydraulic means for raising and lowering said truck body, a fluid pump for supplying fluid under pressure for both said hydraulic means, power take off means for supplying power for operating said pump and a common manual control for both said hydraulic means for initiating the raising of the downward extension before initiating the raising of the truck body.

15. In an automotive truck of the character described, in combination, a truck body pivoted for dumping, a power driven endless conveyor mounted in the upper part of said body and having a pivotally mounted downward extension, hydraulic means for raising and lowering said downward extension, hydraulic means for raising and lowering said truck body, a fluid pump for supplying fluid under pressure for both said hydraulic means, power take off means for supplying power for operating said pump and for operating said endless conveyor, means for automatically disconnecting the supply of power to the endless conveyor when the body is raised and a common manual control for said hydraulic means for effecting sequential raising of said downward extension and said pivoted body.

16. In an automotive truck of the character described, in combination, a truck body pivoted for dumping, a power driven endless conveyor mounted in the upper part of said body and having a pivotally mounted downward and rearward extension, hydraulic means for raising and lowering said downward extension, hydraulic means for raising and lowering said truck body, a fluid pump for supplying fluid under pressure for both said hydraulic means, power take off means for supplying power for operating said pump and for operating said endless conveyor and gear shift means cooperating with said power take off means for supplying power alternatively either to the fluid pump or to the endless conveyor.

17. In an automotive truck of the character described, in combination, a truck body pivoted for dumping, a power driven endless conveyor mounted in the upper part of said body and having a pivotally mounted downward extension, hydraulic means for raising and lowering said downward extension, hydraulic means for raising and lowering said truck body, a fluid pump for supplying fluid under pressure for both said hydraulic means, power take off means for supplying power for operating said pump and for operating said endless conveyor, gear shift means cooperating with said power take off means for supplying power alternatively either to the fluid pump or to the endless conveyor and means for automatically disconnecting the supply of power to the endless conveyor when the body is raised.

18. In an automotive truck of the character described, in combination, a truck body, an endless conveyor, comprising a pair of side chains, carried by said truck body, a pair of laterally and oppositely disposed drive wheels for driving, respectively, the side chains of the conveyor, the space between said drive wheels being unobstructed by a transversely extending shaft, and means for applying power to said drive wheels.

19. In an automotive truck of the character described, in combination, a truck body, an endless conveyor, comprising a pair of side chains, carried by said truck body, a pair of laterally and oppositely disposed drive wheels for driving, respectively, the side chains of the conveyor, the space between said drive wheels being unobstructed by a transversely extending shaft, and a common means for applying power simultaneously to said drive wheels.

20. In an automotive truck of the character described, in combination, a truck body, an endless conveyor, comprising a pair of side chains, carried by said truck body, a pair of laterally and oppositely disposed drive wheels for driving, respectively, the side chains of the conveyor, the space between said drive wheels being unobstructed by a transversely extending shaft, a downwardly extending drive shaft, and means operatively connecting said drive wheels with said downwardly extending drive shaft.

21. In an automotive truck of the character described, in combination, a truck body pivoted for dumping, an endless conveyor, comprising a pair of side chains, carried by the upper, rear part of said truck body, a pair of laterally and oppositely disposed drive wheels, for driving, respectively, the side chains of the conveyor, the space between said drive wheels being unobstructed by a transversely extending shaft, and means, including a clutch disconnectible when the body is raised for dumping, for applying power simultaneously to said drive wheels.

22. In an automotive truck of the character described, in combination, a truck body, an endless conveyor, comprising a pair of side chains, carried by said truck body, a pair of laterally and oppositely disposed drive wheels for driving, respectively, the side chains of the conveyor, the space between said drive wheels being unobstructed by a transversely extending shaft, means for resiliently mounting said drive wheels for causing them to exert tension on said side chains, and means for applying power to said drive wheels.

23. In an automotive truck of the character described, in combination, a truck body, an endless conveyor, comprising a pair of side chains, carried by said truck body, a pair of laterally and oppositely disposed drive wheels for driving, respectively, the side chains of the conveyor, the space between said drive wheels being unobstructed by a transversely extending shaft, means for resiliently mounting said drive wheels for causing them to exert tension on said side chains, a downwardly extending drive shaft, and means operatively connecting said drive wheels with said downwardly extending drive shaft.

24. In an automotive truck of the character described, in combination, a truck body pivoted for dumping, an endless conveyor, comprising a pair of side chains, carried by the upper, rear part of said truck body, a pair of laterally and oppositely disposed drive wheels, for driving, respectively, the side chains of the conveyor, the space between said drive wheels being unobstructed by a transversely extending shaft, means for resiliently mounting said drive wheels for causing them to exert tension on said side chains, and means, including a clutch disconnectible when the body is raised for dumping, for applying power simultaneously to said drive wheels.

25. In an automotive truck of the character described, the combination of a tiltable truck body, an endless conveyor comprising a portion in the upper part of the truck body, and a second portion extending downwardly and outwardly, said second portion of the conveyor mounted for pivotal movement with respect to the first portion, resilient means cooperating with the front end of the conveyor for keeping it taut and for absorbing shocks, means for driving the conveyor, power driven hydraulic means for raising and lowering said truck body, and means for raising and lowering the downward extension of the endless conveyor.

LORON G. KURTZ.
CARL C. OTTOSON.